United States Patent
Lewis et al.

(10) Patent No.: US 6,891,149 B1
(45) Date of Patent: May 10, 2005

(54) OPTICAL PHASE DETECTOR

(75) Inventors: Meirion Lewis, Malvern (GB); Rebecca Wilson, Malvern (GB); Peter Sample, Plymouth (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/786,469

(22) PCT Filed: Sep. 22, 1999

(86) PCT No.: PCT/GB99/03179

§ 371 (c)(1),
(2), (4) Date: Mar. 5, 2001

(87) PCT Pub. No.: WO00/17613

PCT Pub. Date: Mar. 30, 2000

(30) Foreign Application Priority Data

Sep. 22, 1998 (GB) .............................................. 9820493

(51) Int. Cl.[7] .............................. G01J 1/04; G01J 1/42; H01S 3/10
(52) U.S. Cl. .................... 250/227.14; 250/216; 372/26; 372/28; 372/30
(58) Field of Search .......................... 250/227.14, 216; 372/26, 28, 30; 331/9, 25; 359/135, 138, 183

(56) References Cited

U.S. PATENT DOCUMENTS

| | | | |
|---|---|---|---|
| 4,587,487 A | 5/1986 | Zanzucchi | |
| 4,972,424 A | 11/1990 | Wissman | |
| 5,204,640 A | * | 4/1993 | Logan, Jr. ....................... 331/9 |
| 5,349,437 A | 9/1994 | Bobb | |
| 5,396,166 A | 3/1995 | Vohra et al. | |
| 5,917,628 A | * | 6/1999 | Ooi et al. ..................... 398/98 |

FOREIGN PATENT DOCUMENTS

| | | |
|---|---|---|
| DE | 42 24 744 | 2/1994 |
| EP | 0 337 796 | 10/1989 |
| EP | 0 388 929 | 9/1990 |
| GB | 2 166 864 | 5/1986 |
| GB | 2 171 514 | 8/1986 |
| GB | 2 236 030 | 3/1991 |
| GB | 2 307 332 | 5/1997 |
| WO | WO91/16597 | 10/1991 |

* cited by examiner

*Primary Examiner*—John R. Lee
*Assistant Examiner*—Paul M. Gurzo
(74) *Attorney, Agent, or Firm*—Nixon & Vanderhye P.C.

(57) ABSTRACT

An optical phase detector comprising coupling means for receiving two optical inputs and for producing two combined optical outputs, means for detecting the two combined optical outputs and producing two corresponding electrical signals, and means for measuring the difference between the two electrical signals and generating an output difference signal which may be used to provide an indication of the phase difference between the two optical inputs. The optical phase detector comprises a voltage-tuneable electro-optic phase modulator for modulating the phase of an optical input to the optical phase detector to provide a linearized response. In this arrangement the output difference signal may be maintained at a constant level by varying the voltage applied to the electro-optic phase modulator, the applied voltage providing an indication of the phase difference between the two optical inputs. Applications include frequency discriminators, various sensors, and a laser stabilization apparatus.

13 Claims, 8 Drawing Sheets

(a)

(b)

Figure 1:
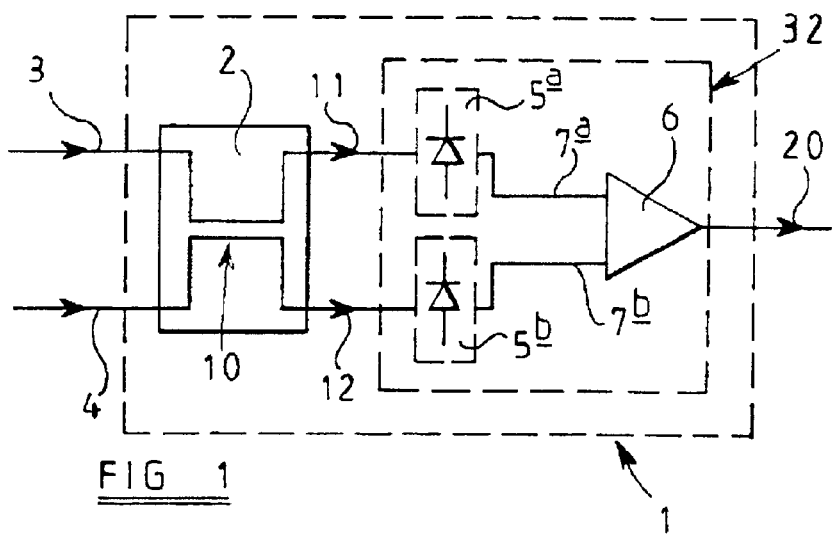

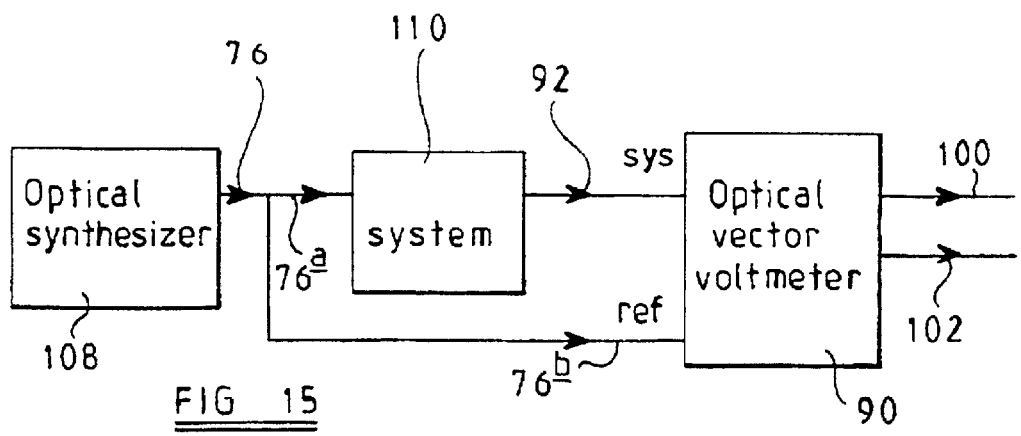
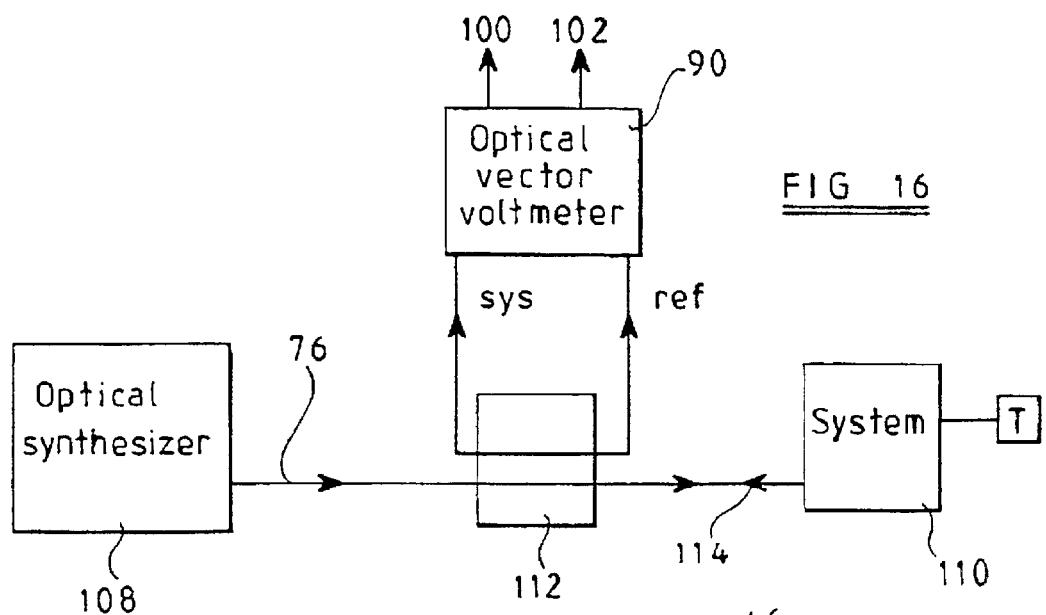
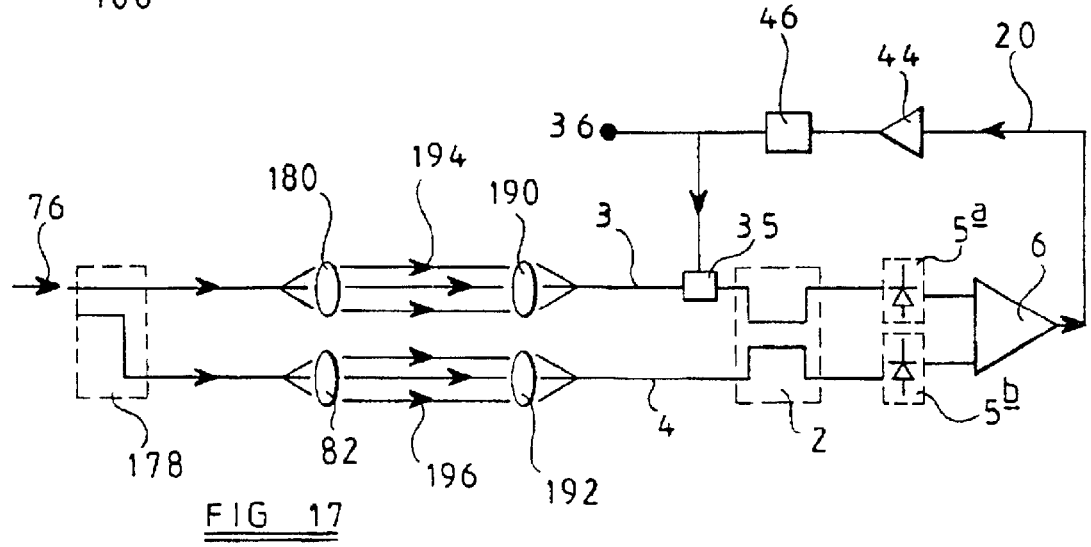

OPTICAL PHASE DETECTOR

This application is the U.S. national phase of international application PCT/GB99/03179, filed in English on 22 Sep. 1999 which designated the U.S. PCT/GB99/03179 claims priority to GB Application No. 9820493.6 filed 22 Sep. 1998. The entire contents of these applications are incorporated herein by reference.

The invention relates to an optical phase detector for measuring the phase difference between two input signals. The invention also relates to applications of an optical phase detector, including use in an optical frequency discriminator and a laser stabilisation apparatus.

By way of background to the present invention, U.S. Pat. No. 5,396,166 describes a fibre optic interferometer sensor system including a fibre optic interferometer having an electrostrictive transducer bonded to one of the first and second optical fibre arms of the interferometer. The electrostrictive transducer has non-linear characterstics which enables detection of low frequency or DC signals at side bands of a high frequency carrier. Also by way of background to the invention, EP0388929 describes a fibre optic laser gyro in which a modulated phase difference is detected between two rays of light phase modulated by means of a phase modulator having propagated through an optical fibre coil in opposite directions and having interfered with each other.

Conventionally, phase difference may be measured optically by interfering two beams to form an interference fringe pattern and measuring the fringe pattern as it moves across a camera face due to a change in the relative phase. A disadvantage of this type of measurement is that it relies on the counting of fringes and interpolation between fringes to measure phase or position accurately. This process can be relatively slow and not especially accurate. Such detectors may be used in displacement measurement schemes, such as in laser metrology, to measure position accurately i.e. to a fraction of an optical wavelength.

Optical techniques have previously been used for the generation of microwave radiation, by mixing two stable lasers, and for phased array antenna beam-forming, in which simple optical systems are used to perform a complicated microwave function. A known technique for the generation of stabilised microwave radiation has been achieved by incorporating a fibre optic delay line in an RF, microwave or millimeter wave (mm-wave) frequency discriminator circuit. This enables the difference in frequency of two stable laser inputs to be controlled accurately and therefore the RF, microwave or mm-wave output can be stabilised (British Patent Application No. GB2307332). In this system the frequencies of the lasers can drift but the difference in frequency between them remains constant. It is an object of the system to provide an apparatus for providing stable radiation at RF frequencies.

In many applications high spectral purity (i.e. stable) laser radiation is required. These applications include fundamental physics research, for example graviton detection, photochemistry, luminescence excitation spectroscopy, absorption and Raman spectroscopy, and applications such as fibre optic communications, sensors, laser radar, laser air speed indicators and laser vibrometry. However, lasers of well defined frequency (or wavelength) and high spectral purity (e.g. narrow linewidth) tend to be expensive and complex. High spectral purity is attainable with certain gas lasers, but there is a need for solid state lasers of similar or superior performance. Solid state lasers include laser diodes and diode pumped YAG lasers. The most widely used laser device is the laser diode. Although these devices are relatively cheap, devices of this kind have a particularly poor spectral stability, especially in the case of Fabry-Perot etalon designs which often support several modes simultaneously.

For many applications, it is useful to overcome the problem of poor spectral quality and to be able to stabilise the frequency output of a single laser. Furthermore, for some applications, extremely pure laser radiation is required.

The stabilisation of a laser output with an external component has previously been reported [*FM noise reduction and sub kilohertz linewidth of an AlGaAs laser by negative electrical feedback*, M. Ohutso et al., IEEE *Journal of Quantum Electronics* 26 (1990) pp 231–241]. In this system, the external component is one or more high finesse Fabry-Perot (FP) interferometer. Stabilisation of the laser is achieved by utilising the reflectance characteristics of the interferometer or interferometers to detect FM noise. Electrical feedback is then ised to feed back this signal to correct the laser output. However, the system is a complex, free-space system which gives cost disadvantages. Also, because the system operates in free space it is particularly susceptible to external actors such as vibration, air circulation and dust and also to changes in temperature.

By way of background to the present invention, U.S. Pat. No. 4,972,424 describes a laser stabilisation apparatus for stabilising a laser cavity. The apparatus employs a piezo-electric transducer controlling the position of one of the cavity mirrors, the transducer being driven to change the effective cavity length in response to measurement of the laser output power.

It is an object of the present invention to provide a laser stabilisation apparatus which overcomes these problems. It is a further object of the invention to provide an optical phase detector which may be included in the laser stabilisation apparatus.

According to a first aspect of the present invention, an optical phase detector comprises;

means for receiving two optical inputs and producing two combined optical outputs, detection means for detecting the two optical outputs and converting the intensity of each of the combined optical outputs into an electrical signal, means for measuring the difference between the two electrical signals and generating an output difference signal, and a voltage-controlled electro-optic phase modulator for modulating the phase of one optical input to the optical phase detector, the electro-optic phase modulator having a substantially linear response whereby, in use, the output difference signal is maintained at a substantially constant level by varying the voltage applied to the electro-optic phase modulator, the voltage being applied to the modulator by means of a feedback loop in response to the output difference signal, the applied voltage providing an indication of the phase difference between the two optical inputs.

The optical phase detector may include coupling means for receiving two optical inputs and producing two combined optical outputs. The coupling means may be any means for producing two combined optical outputs from the two optical inputs, wherein the coupling means produce two intermediate optical outputs from each of the optical inputs, the two intermediate optical outputs produced from each of the optical inputs being in phase quadrature, and wherein the intermediate optical outputs are combined to form the two combined optical outputs. For example, the coupler may be an optical fibre coupler, or other coupled waveguide device, such as in integrated optic waveguide coupler.

Preferably, the constant level is substantially zero volts. As the voltage applied to the elect-optic phase modulator provides an indication of the phase difference between the two optical inputs, this provides the advantage that the optical phase detector is linearised as the voltage required to drive the electro-optic phase modulator is directly proportional to the phase difference between the two optical inputs. The voltage is applied to the electro-optic modulator by means of a feedback loop from the optical phase detector output. The optical phase detector may therefore further comprise means for feeding back the output difference signal to the electro-optic phase modulator, the applied voltage to the electro-optic modulator being varied in response to the output difference signal so as to maintain the difference signal at the substantially constant level.

The optical phase detector provides the advantage that it provides an electrical output signal indicative of relative phase difference between the two optical input signals. This cannot be achieved with conventional electrical phase detectors due to the high optical frequencies of the inputs.

Furthermore, although phase difference may be measured optically by interfering two beams to form an interference fringe pattern and measuring the fringe pattern as it moves across a camera face due to a change in the relative phase, this relies on the counting of fringes and interpolation between fringes to measure phase or position accurately. The optical phase detector of the invention is advantageous as the output occurs as a direct electrical signal giving a linear measure of phase difference over an extended range which may be at least 360°.

The electro-optic phase modulator may comprise an optical waveguide on an integrated optic substrate, the substrate preferably being any of lithium niobate, lithium tantalate or gallium arsenide. The frequency response of the electro-optic phase modulator may be at least 1 MHz and, preferably, may be at least 1 GHz. Alternatively, the electro-optic phase modulator may take the form of an optical fibre carrying a piezoelectric material. For example, the piezoelectric material may be deposited on, or otherwise attached to, the optical fibre. The optical fibre may be stripped of its outer cladding.

Preferably, the two optical inputs to the coupling means have substantially equal amplitudes. The two optical inputs may be derived from the same source of radiation, for example a single laser. In this arrangement, the optical phase detector provides an electrical output dependent on the phase difference between two optical inputs from the same source of radiation, therefore providing a measure of the relative phase difference. Alternatively, in some applications, the two optical inputs may be derived from two different sources of radiation, preferably having the same amplitude.

The optical phase detector may also comprise polarisation modulation means for modulating the polarisation of at least one of the inputs to the optical phase detector so as to ensure the polarisation of the two inputs is substantially the same. Typically, the polarisation modulation means may be a fibre-optic or integrated optic polarisation modulator.

The optical phase detector may comprise two photodetectors, each one for detecting the intensity of one of the optical outputs and for generating an electrical output signal in response to the corresponding optical output. Preferably, the photodetectors are matched photodetectors.

According to a second aspect of the invention, a frequency discriminator apparatus comprises;

an optical phase detector as described herein, means for receiving a primary optical input from a source of radiation and for producing two primary optical outputs, and means for introducing a relative delay between the two primary optical outputs, the two primary optical outputs, having a relative delay therebetween, providing the inputs to the optical phase detector.

For example, the frequency discriminator may include primary coupling means for producing two primary optical outputs from the primary optical input. Preferably, the two primary optical outputs have substantially the same amplitude.

In the frequency discriminator apparatus, the electrical output from the optical phase detector provides a measure of the optical frequency (or wavelength) of an input laser providing the relative delay is known and is substantially stable.

Preferably, the means for introducing a relative delay between the two primary optical outputs comprise two lengths of optical fibre having different optical path lengths. For example, one length of optical fibre may be used through which one of the primary optical outputs is transmitted, with the other primary optical output being transmitted through a negligible length of optical fibre. Alternatively, another type of delay medium may be used, for example an integrated optic de ay line.

The one or more length of optical fibre may be single mode optical fibre, temperature stable, single mode optical fibre or temperature stable polarisation maintaining optical fibre. The use of temperature-stable optical fibre provides the advantage that the apparatus has improved temperature stability. Alternatively, or in addition, to achieve temperature stability, the apparatus may be housed in a temperature-stable oven.

The frequency discriminator apparatus, comprising an optical phase detector as herein described, provides a sensor for measuring any one of, for example, temperature, pressure or strain, when that measurand is applied to the optical fibre delay line. It may be advantageous in a sensor application if the relative optical delay in the apparatus is substantially zero.

According to another aspect of the present invention, a laser stabilisation apparatus for stabilising the output from a source of radiation comprises;

a frequency discriminator apparatus comprising input means for receiving a primary optical input from a source of radiation having a frequency, and for producing two primary optical outputs, means for introducing a relative delay between the two primary optical outputs, the two primary optical outputs, having a relative delay therebetween, being input to an optical phase detector, wherein the optical phase detector comprises coupling means for receiving the two optical inputs and producing two combined optical outputs, detection means for detecting the intensity of the two combined optical outputs and converting the intensity of each of the combined optical outputs into an electrical signal, and means for measuring the difference between the two electrical signals and generating an output difference signals, the laser stabilisation apparatus further comprising feedback means for feeding back the output difference signal from the optical phase detector of the frequency discriminator to the source of radiation.

The source of radiation may be a laser, the laser having a suitable tuning point such that the output difference signal may be fed back to the tuning point.

The input means for receiving the primary optical input may be input coupling means, such as a coupler, or a beam splitter.

The apparatus is less complex than the known apparatus and is therefore cheaper to construct. It also avoids the problems of free space optics. Also, the laser stabilisation apparatus is capable of stabilising the output from a laser over a narrow to broad frequency range which may be varied depending on requirements, for example through the choice of the differential delay time.

In one embodiment of the laser stabilisation apparatus, the apparatus may comprise one or more additional frequency discriminator, each frequency discriminator having corresponding feedback means for feeding back the electrical output from the associated optical phase detector to the source of radiation. The outputs from the optical phase detectors of the different frequency discriminators may be fed back to different control points on the source of radiation.

The apparatus also enables temperature stability, through the use of temperature-stable optical fibre or other delay means, as well as short term stability to be imparted to the output laser spectrum. The apparatus is also relatively insensitive to vibration and dust.

The optical phase detector forming part of the laser stabilisation apparatus may include a voltage-controlled electro-optic phase modulator for modulating the phase of one optical input to the optical phase detector, the electro-optic phase modulator having a substantially linear response.

The invention also relates to a method of stabilising the output from a laser, using the laser stabilisation apparatus as herein described.

The optical phase detector of the invention may also be used in other applications, such as laser metrology, in a displacement measurement scheme capable of measuring nanometre displacements. This aspect of the invention provides an advantage over known displacement measurement schemes which rely on the counting of fringes and interpolation between fringes to measure position accurately.

According to another aspect of the invention, an optical frequency synthesizer comprises;
the laser stabilisation apparatus as herein described, and means for varying the frequency of the laser output.

The laser stabilisation apparatus forming part of the optical frequency synthesizer may include two lengths of optical fibre through which the primary optical outputs are transmitted, the two optical fibres having different optical path lengths.

Preferably, the optical frequency synthesizer may include an electro-optic phase modulator arranged in the path of one of the lengths of optical fibres, whereby application of a SAWTOOTH-like voltage waveform to the electro-optic phase modulator gives rise to a variation of the frequency of the laser output. Typically the electro-optic phase modulator may be arranged in series with one of the lengths of optical fibres.

The optical frequency synthesizer may also comprise a voltage source, providing an SAWTOOTH-like voltage waveform, for applying a voltage to the electro-optic phase modulator.

Alternatively, the optical frequency synthesizer may comprise a differential amplifier, the output from the optical phase detector being fed back to an input of the differential amplifier, the output from the differential amplifier being fed back to the laser.

The optical phase detector included in the laser stabilisation apparatus forming part of the optical frequency synthesizer may preferably include, but need not include, an electro-optic phase modulator.

According to another aspect of the invention, an optical vector voltmeter for comparing an input laser signal and a reference signal comprises;
the optical phase detector as herein described,
a photodetector for receiving the input laser signal and for generating an output signal dependent on the amplitude of the input laser signal,
the output from the electro-optic phase modulator providing a measure of the phase difference between the reference signal and the input laser signal.

Preferably, the optical phase detector included in the optical vector voltmeter includes an electro-optic phase modulator. This provides the advantage that there is a linear output covering at least 360°.

According to another aspect of the invention, an optical network analyser for measuring the transmitted or reflected amplitude and phase of a system at a plurality of frequencies comprises;
an optical frequency synthesizer for generating a reference signal at a plurality of frequencies, and
the optical vector voltmeter as herein described, for receiving as inputs the reference signal and the signal transmitted or reflected by the system.

The optical frequency synthesizer included in the optical network analyser may be of the type herein described, or may be a conventional optical frequency synthesizer.

In any of aspects of the invention described above, single mode optical fibre, polarisation maintaining optical fibre, temperature stable single mode optical fibre or temperature stable polarisation maintaining optical fibre may be used.

Although aspects of the invention are herein described as in-fibre applications, all aspects of the invention may make use of free space optics in all or some of the optical paths. For example, free space optics may be used in a gas sensor. Similarly, integrated optics may be employed.

Figure 2:
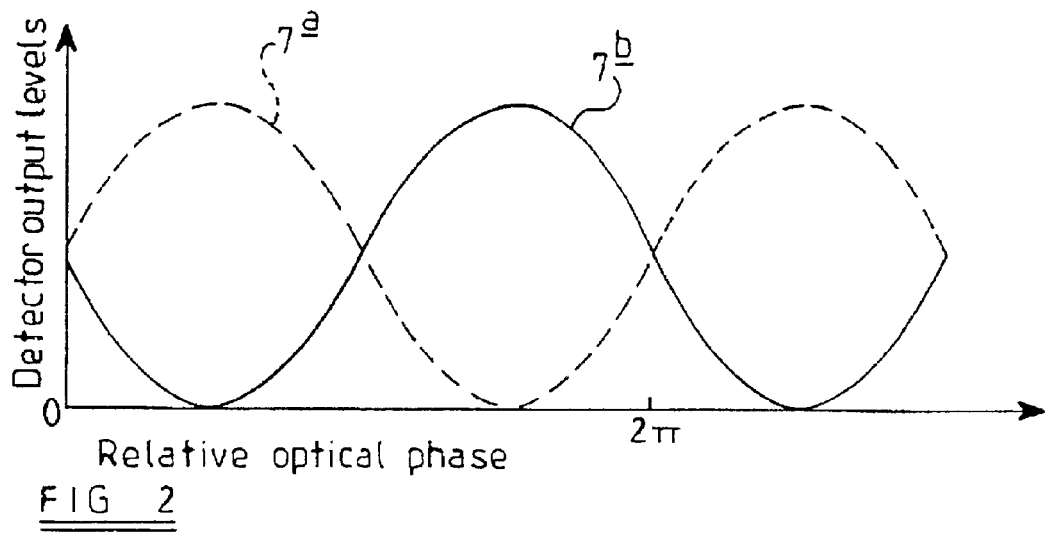
Figure 3:
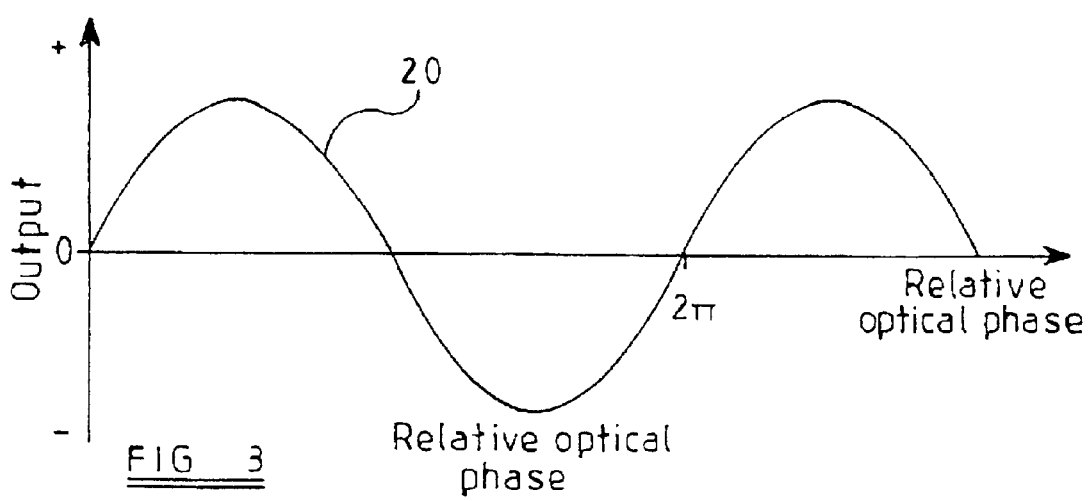
Figure 4:
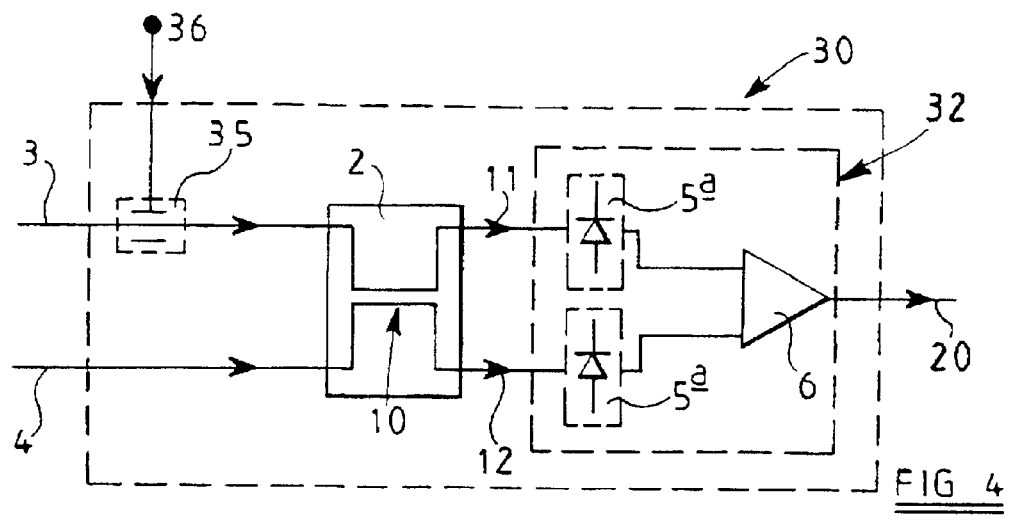
Figure 5:
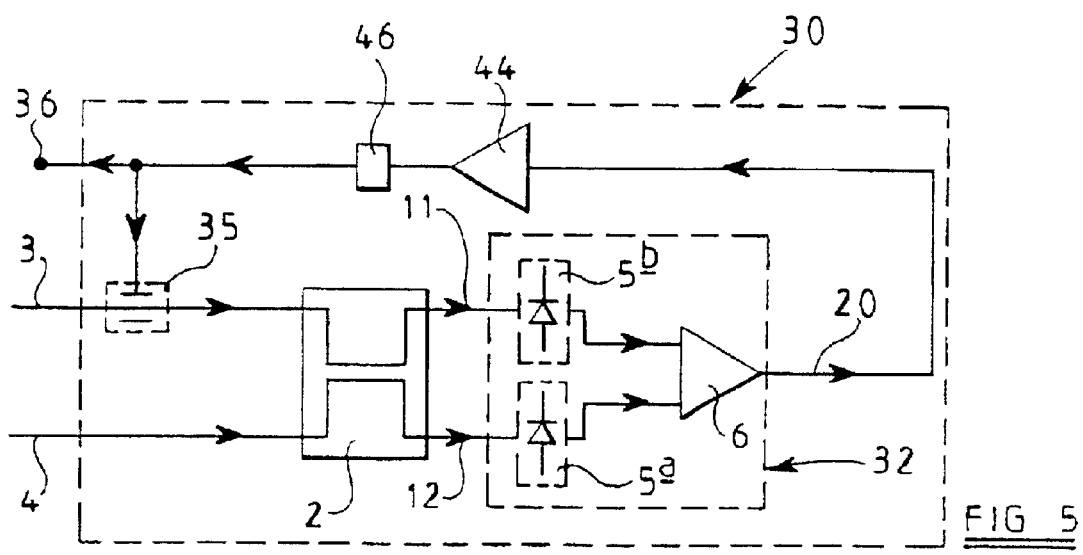
Figure 6A:
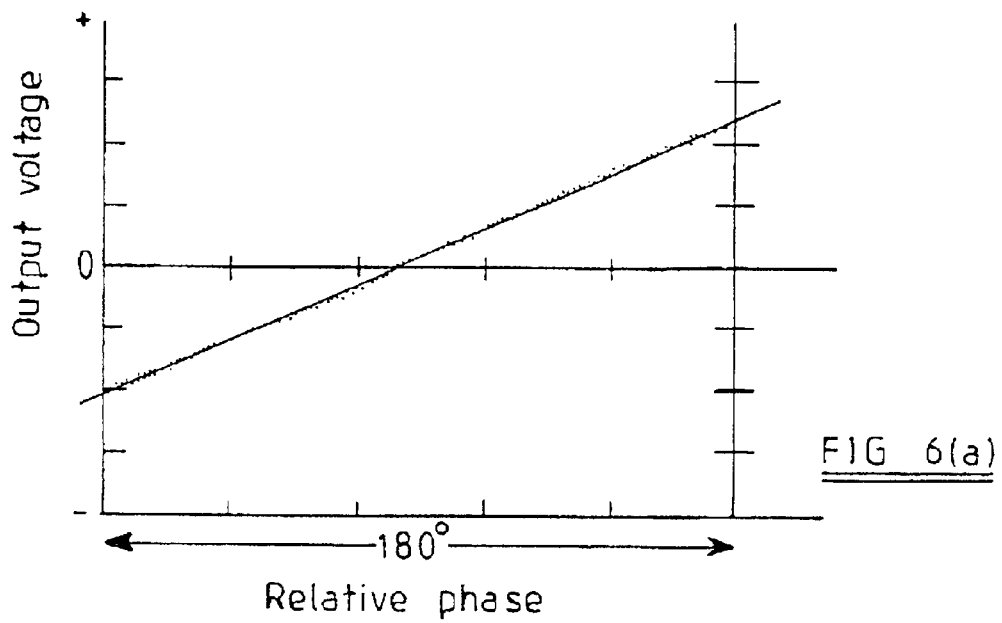
Figure 6B:
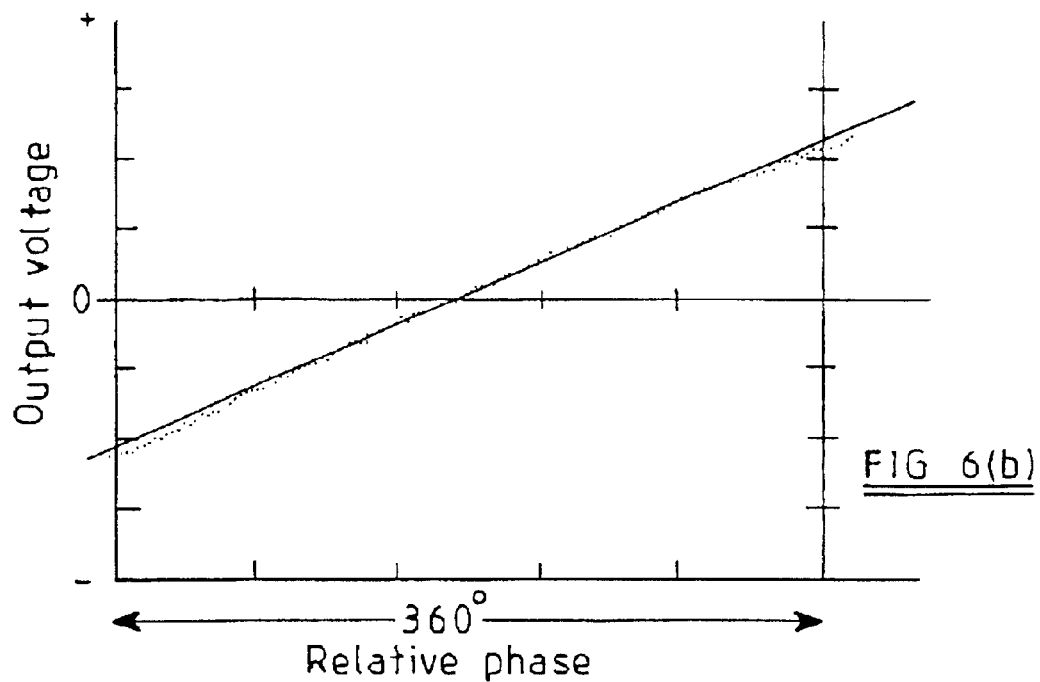
Figure 7:
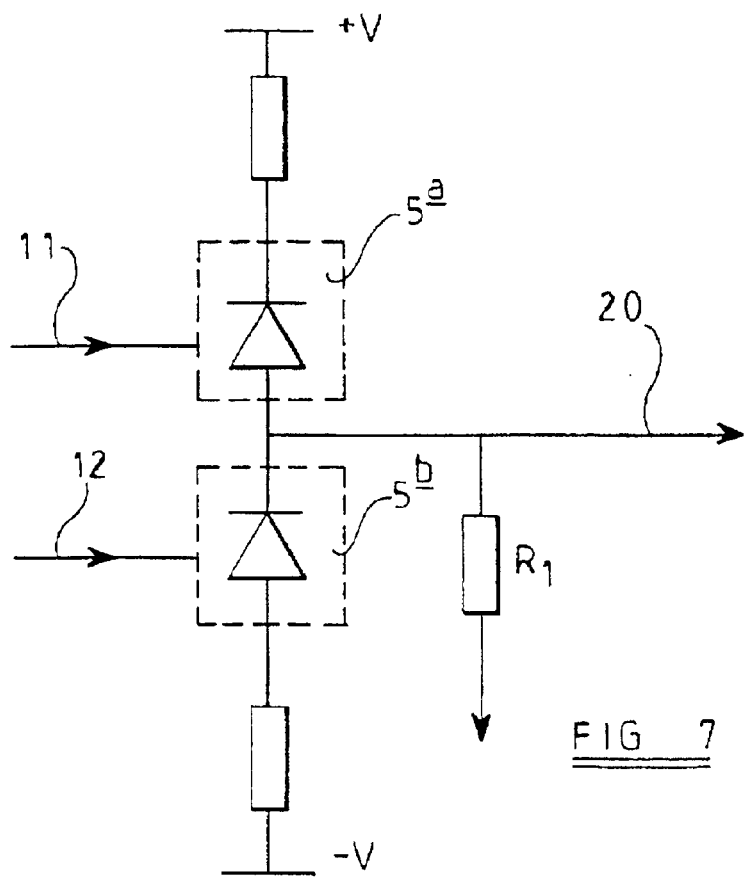
Figure 8:
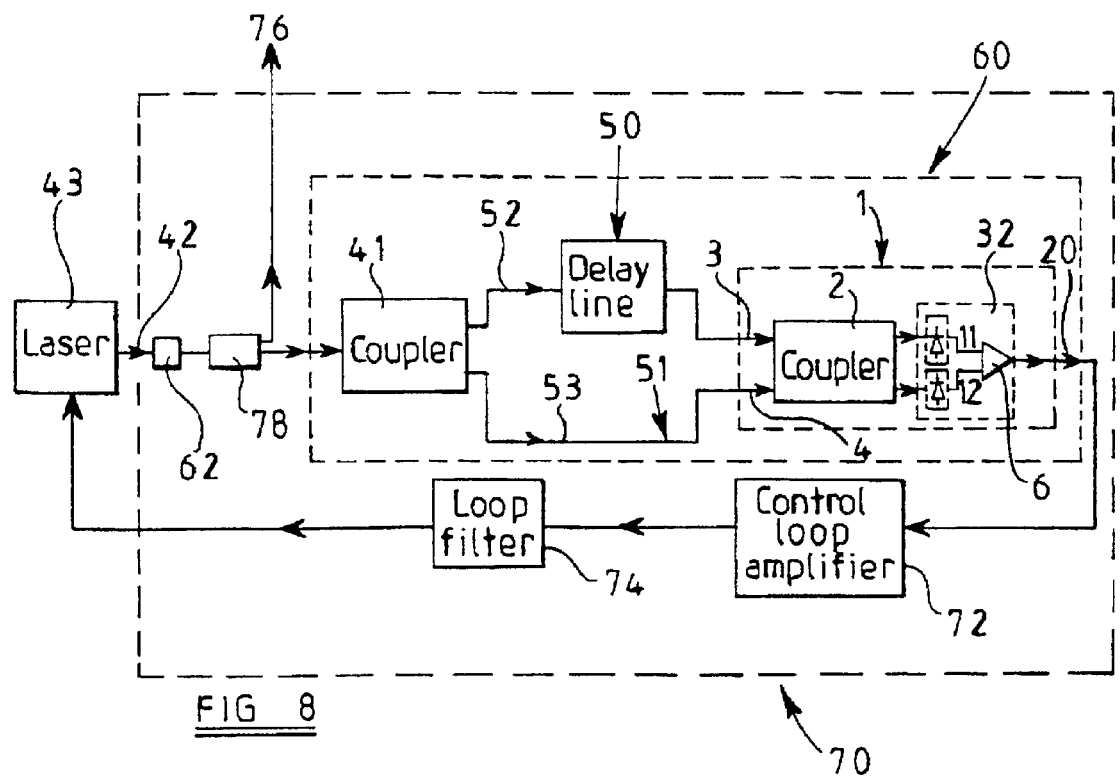
Figure 9A:
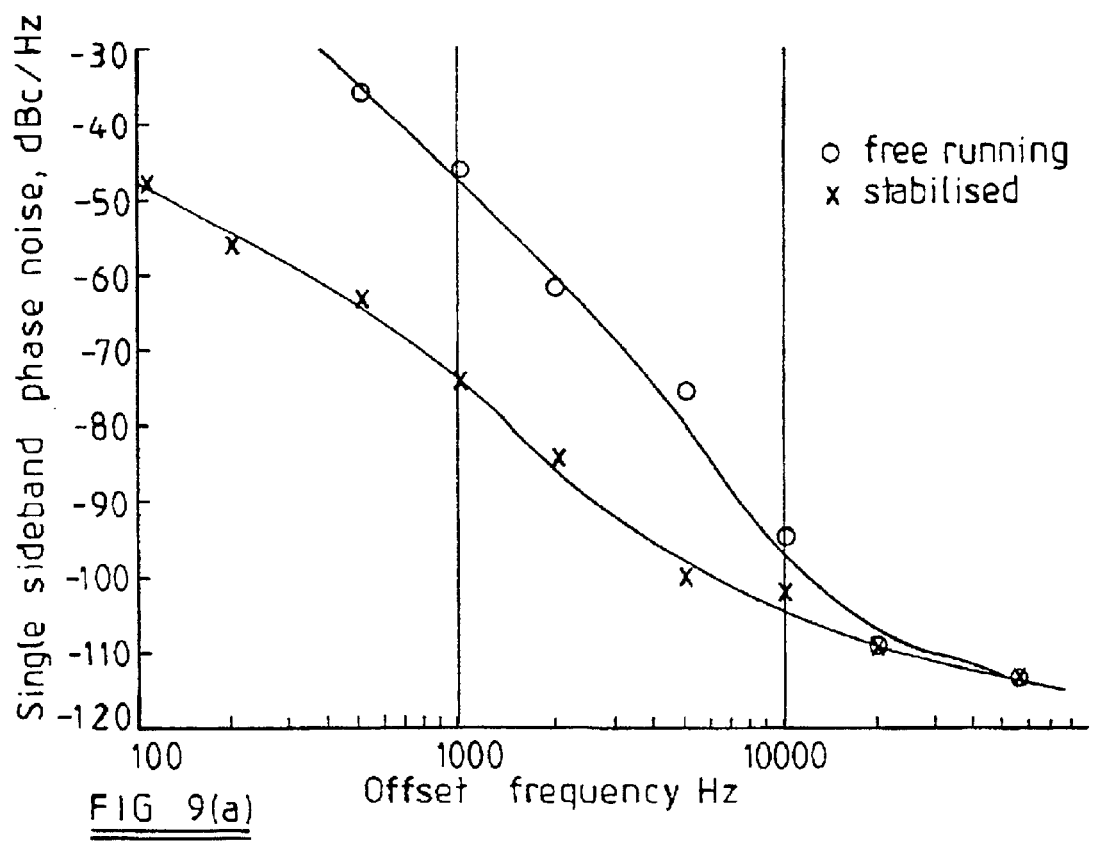
Figure 9B:
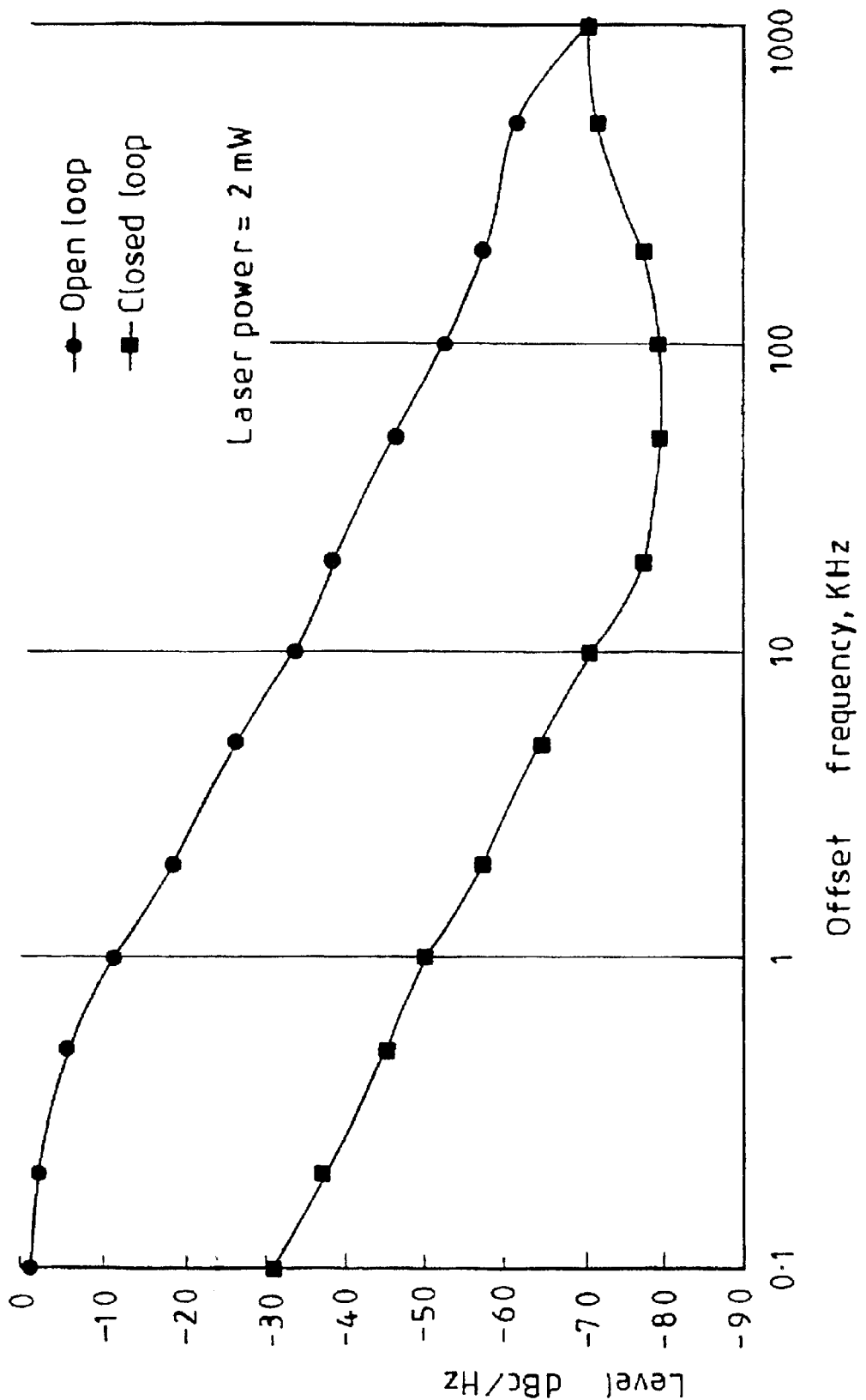
Figure 10:
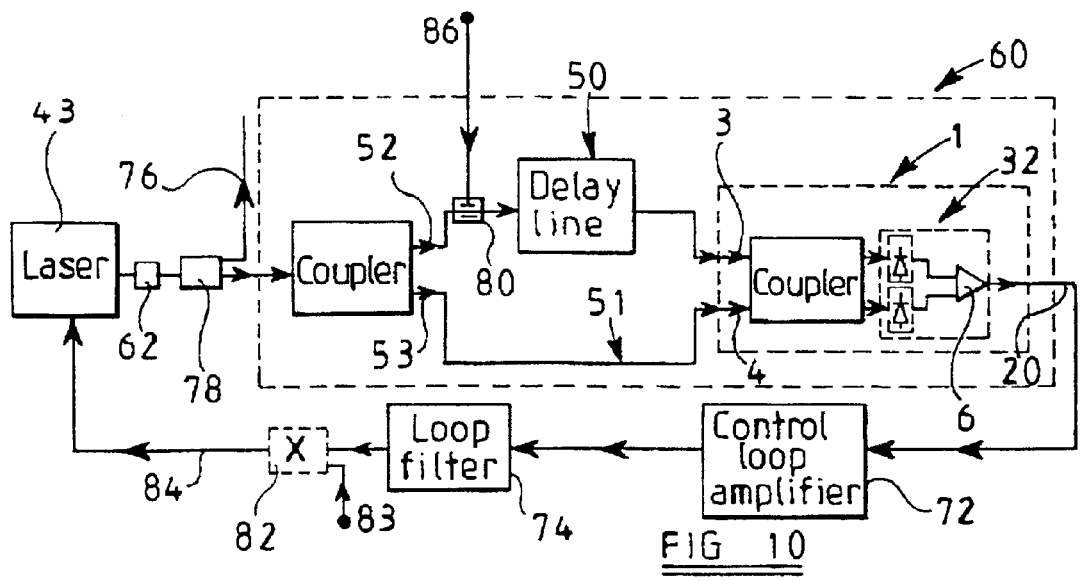
Figure 11:
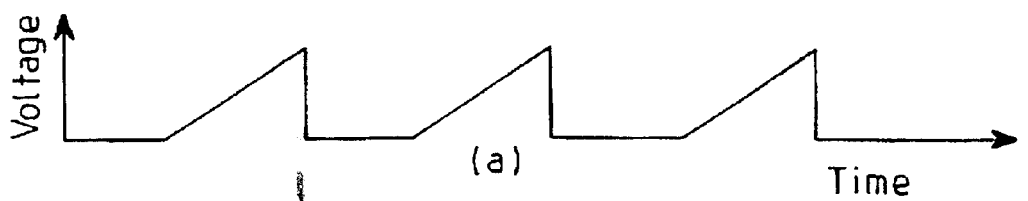
Figure 12:
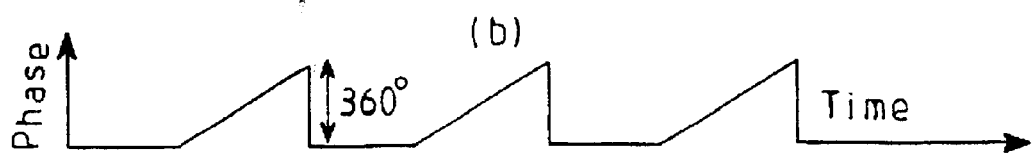
Figure 12:
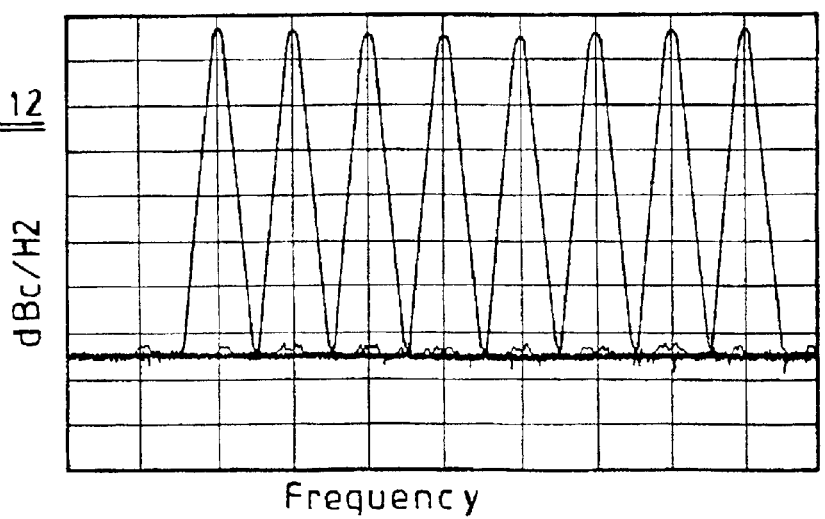
Figure 14:
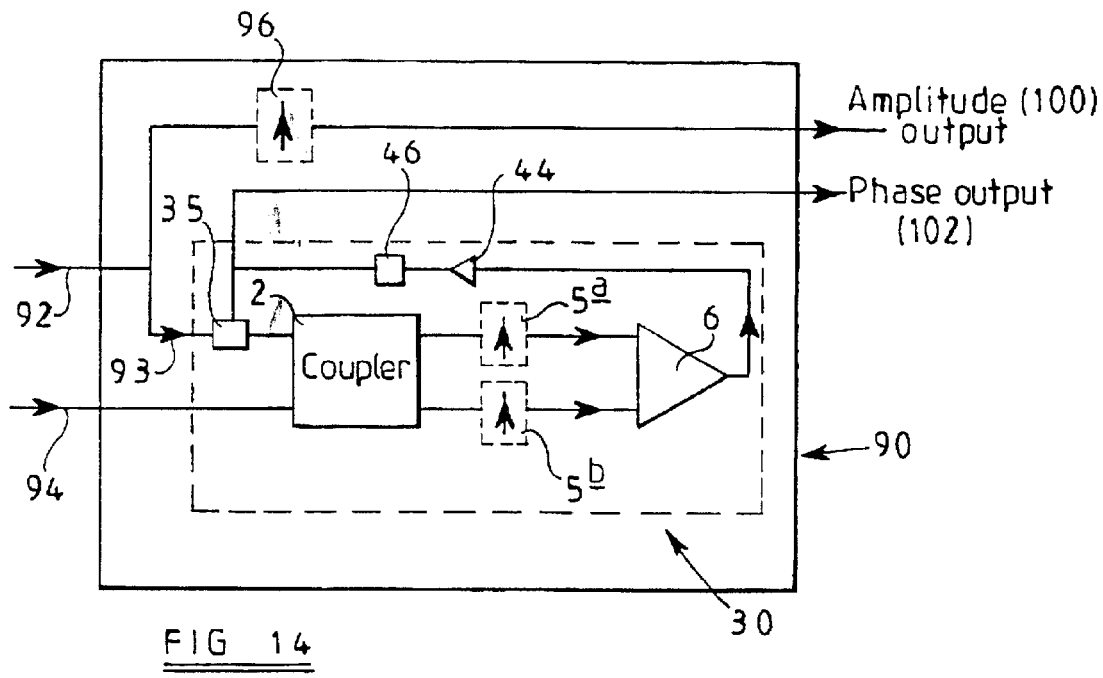
Figure 13:
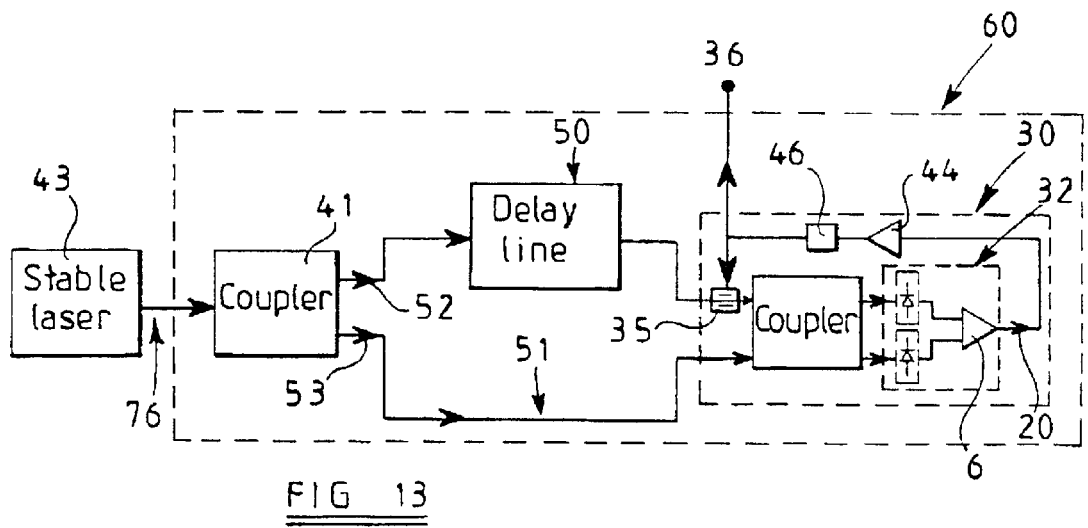

The invention will now be described, by way of example only, with reference to the following figures in which;

FIG. 1 shows a diagram of a conventional optical phase detector,

FIG. 2 illustrates the output levels of the detectors of the optical phase detector of FIG. 1 as a function of relative optical phase, FIG. 3 illustrates the differential output level between the detector outputs shown in FIG. 2 as a function of relative optical phase, FIG. 4 shows a diagram of a linearised version of the optical phase detector shown in FIG. 1, FIG. 5 shows the linearised optical phase detector shown in FIG. 4 including an electrical feedback loop, FIGS. 6(a) and 6(b) shows experimental results obtained using the linearised optical phase detector, with feedback, as shown in FIG. 5, FIG. 7 shows an example of a practical electrical circuit of the detectors included in the optical phase detector in FIG. 1, FIG. 8 shows the laser stabilisation apparatus of the invention, including the optical phase detector shown in FIG. 1, FIG. 9 shows phase noise measurements for unstabilised laser outputs and stabilised laser outputs obtained using the laser stabilisation apparatus of the present invention, for (a) a Lightwave Electronics Series 123 Fibre-coupled Diode-pumped solid state non-planar ring laser operating at 1319 nm and (b) an E-Tek DFB laser, type LDPM, operating at 1550 nm, FIG. 10 shows the laser stabilisation apparatus shown in FIG. 8, and further comprising an electro-optic phase modulator, or a differential amplifier in the feedback loop of the apparatus, FIG. 11(a) shows an example of a SAWTOOTH voltage waveform which may be applied to the phase modulator in the apparatus of FIG. 10 to provide an optical frequency synthesizer, and FIG. 11(b) shows the variation of phase of the electro-optic phase modulator to which a SAWTOOTH waveform voltage is applied, FIG. 12 shows an experimental result obtained using the apparatus shown in FIG. 10, FIG. 13 shows a schematic diagram to illustrate how the optical phase detector shown in FIG. 5 may be employed in a sensor, FIG. 14 shows a schematic diagram to illustrate how the optical phase detector shown in FIG. 5 may be employed in an optical vector voltmeter, FIG. 15 shows a schematic diagram to illustrate how the optical vector voltmeter shown in FIG. 14 and the apparatus shown in FIG. 10 may be employed in an optical network analyser for transmission measurement of a system under test, FIG. 16 shows a schematic diagram to illustrate how the optical vector voltmeter shown in FIG. 14 and the apparatus shown in FIG. 10 may be employed in an optical network analyser for reflection measurement of a system under test, and FIG. 17 shows a schematic diagram of a gas sensor application of the optical phase detector and employing free space optics.

It is an object of one aspect of the invention to provide an optical phase detector capable of producing an electrical output signal dependent on the phase difference, or relative phase, between two optical inputs of substantially the same frequency.

Referring to FIG. 1, an optical phase detector, referred to generally as 1, comprises a 50/50 fibre optic directional coupler 2 for coupling two inputs 3, 4. The detector 1 also comprises two optical detectors 5a, 5b and a differential amplifier 6. In operation, the two inputs 3, 4 are input to the optical phase detector 1 through the directional coupler 2. A 50/50 single mode fibre optic directional coupler has a central portion 10 comprising two coupled optical fibres.

The inputs 3, 4 to the coupler are combined by evanescent coupling in this central portion 10 and two combined outputs 11, 12 are generated. These combined outputs 11, 12 will vary in amplitude (and intensity) depending on the phase difference between the two input signals 3, 4. Preferably, the input signals 3, 4 have substantially equal amplitudes.

The function of the coupler is to produce two intermediate outputs from each of the two inputs (i.e. four in total) which are then combined to form the two outputs 11, 12. Each input signal gives rise to two intermediate optical outputs and it is an important property of the coupler that the two intermediate outputs produced from each of the individual inputs are in phase quadrature (i.e. have a phase difference of substantially 90° therebetween). The intermediate outputs from each of the inputs are combined in pairs to provide the combined outputs 11, 12. The coupler may be any coupling means which provides this function. Ideally, this coupler may be a coupled waveguide device, such as a conventional in-fibre coupler, but other coupler devices may be used.

Typically, the two optical inputs 3, 4 to the optical phase detector may be derived from the same source, such as a laser (not shown). It is preferable for the optical inputs 3, 4 to be taken from the laser output to the phase detector via single mode optical fibre. Alternatively, two beams of radiation may be taken from the laser and coupled to single mode optical fibres, for example by means of lenses, for subsequent input to the optical phase detector 1.

Each of the output signals 11, 12 from the coupler 2 is directed to a separate detector 5a, 5b which converts the intensity of the respective optical input (i.e. inputs 11, 12) into a corresponding electrical output signal 7a, 7b. The electrical signals 7a, 7b output from the detectors 5a, 5b are then passed to a differential amplifier 6 which produces an output 20 proportional to the difference in voltage between the input signals it receives. Preferably, the detectors are matched (i.e. are as identical as possible). For example, they may be made in the same batch or even on the same chip. For clarity, the electrical connections to the detectors are not shown in FIG. 1.

The optical phase detector 1 exploits the fact that the two output signals 7a, 7b from the detectors 5a, 5b depend on the relative phase of the two optical signals 3, 4 input to the coupler 2. That is, the detectors 5a, 5b and the differential amplifier 6 provide a substantially balanced optical detector circuit (referred to generally as 32) and the voltage output from the differential amplifier 6 gives a measure of the phase difference between the two input signals 3, 4. This requires the amplitudes of the inputs 3, 4 to be substantially constant. If the amplitudes of the inputs 3, 4 are varying, it is possible to measure the amplitudes separately and correct for any variation electrically.

In order to measure the phase difference between two optical inputs 3, 4 it is important to ensure the polarisation of the two inputs 3, 4 is the same. This may be achieved by including a polarisation controller in the path of one or both of the input signals 3, 4. For example, if the input signals 3, 4 are coupled to the phase detector 1 from a laser by means of optical fibre a fibre optic polarisation controller may be used in one, or both, of the input pathways 3, 4. Alternatively, in an integrated optical phase detector, an integrated optic polarisation modulator may be used. Polarisation-maintaining optical fibres and couplers may be used throughout the optical phase detector 1 also.

This behaviour of the optical phase detector 1 is illustrated in FIGS. 2 and 3. FIG. 2 shows how the outputs 7a, 7b from the individual detectors vary with the relative phase between the two optical inputs 3, 4. The amplitudes of the output signals 7a, 7b from the two detectors 5a, 5b vary with relative phase as a squared-sinusoid and are relatively in anti-phase. The optical phase detector 1 therefore provides a DC output voltage which is a measure of the phase difference between the two input signals 3, 4.

FIG. 3 shows the differential output 20 of the pair of detector outputs 7a, 7b which varies sinusoidally with the relative optical phase of the inputs 3, 4. The output 20 is bipolar and is particularly useful in some applications, as will be described in more detail later. However, in accordance with a first aspect of the present invention, an improved optical phase detector includes a voltage controlled electro-optic phase modulator to provide an optical phase detector having a linearised response. The "voltage-controlled" electro-optic phase modulator may also be referred to as a "voltage-tuneable" electro-optic phase modulator.

Typically, an electro-optic phase modulator comprises an optical waveguide on an integrated optic substrate, such as lithium niobate, lithium tantalate, gallium arsenide or other electro-optic material. By applying a voltage across the waveguide by means of metallic electrodes the phase of radiation passing through the waveguide can be modulated. The response of electro-optic phase modulators comprising a lithium niobate or lithium tantalate substrate is very linear. In addition, the frequency response of such electro-optic phase modulators is very fast, typically up to 1 GHz or higher.

FIG. 4 shows a manually operated optical phase detector 30 in accordance with one aspect of the present invention. The optical phase detector 30 has a linearised response, and comprises a voltage controlled electro-optic phase modulator 35 in one of the input paths 3, 4 (input 3 in FIG. 4). The electro-optic phase modulator 35 has a substantially linear variation of optical phase with applied voltage 36. If this voltage were manually (or automatically) adjusted to maintain a constant (ideally zero) output 20 from the differential amplifier the voltage 36 applied to the modulator 35 gives a direct linear measure of the relative phase between the optical inputs 3, 4. In practice, automatic, as opposed to manual, adjustment of the applied voltage 36 would be highly desirable. The range of electro-optic phase modulation may be at least 360°.

The electro-optic phase modulator 35 may be placed in the path of one of the inputs 3, 4 to the optical phase detector 1. The output 20 from the differential amplifier 6 is then set at a constant level by applying the appropriate voltage to the voltage-tuned electro-optic phase modulator. Preferably, the output 20 may be maintained at zero volts which makes the measurement insensitive to amplitude variations.

As the response of electro-optic phase modulators is very linear, in particular lithium niobate and lithium tantlate devices, the voltage required to set the differential amplifier output to zero gives a useful measure of the relative phase. The frequency response of the electro-optic phase modulator may, typically, be between 1 MHz and 1 GHz. For some applications, it may be desirable to include an electro-optic phase modulator having a frequency response exceeding 1 GHz. The voltage adjustment may be made manually, or by means of an electrical feedback loop. Including the electro-optic phase modulator provides the advantage that the phase detector is linearised (i.e. the voltage required to tune the electro-optic modulator in order to maintain the differential amplifier at a constant voltage is directly proportional to the measured phase difference) and the operating range is extended to at least 360°. If the difference signal is maintained close to zero the optical phase detector has the further advantage that it is insensitive to amplitude variations in the input optical signals. Additionally, as the frequency response of the electro-optic modulator 35 is very fast, the phase measurement can be determined rapidly. The phase detector is therefore suitable for dynamic measurements. In practice, the speed of response of the optical phase detector may be limited by the detector or feedback electronics.

In an alternative embodiment, the electro-optic phase modulator may take the form of an optical fibre, on which a piezoelectric film is deposited, for example ZnO, the optical fibre being stripped of its outer cladding. By applying a voltage across the ZnO film on the fibre, a phase shift can be induced. This embodiment may be advantageous as it avoids the size, cost and insertion loss of an integrated optic phase shifter.

FIG. 5 shows an embodiment of the linearised optical phase detector 30 which includes an electronic feedback loop, comprising a feedback amplifier 44 and filter 46. As shown in the figure, the feedback amplifier 44 and filter 46 may be separate components, but alternatively the filter may be derived from the amplifier characteristic itself which is carefully designed to be stable. The voltage 36 applied to the electro-optic phase modulator 35 provides the output, which is linearised. The advantage of this embodiment of the phase detector is that it removes the need for a human operator and is relatively fast and accurate in operation. FIGS. 6(a) and 6(b) show experimental results obtained using the device shown in FIG. 5. The measurements were obtained directly from a Tektronix 2430 digital oscilloscope. The solid lines are the best fits to the measured points. This characteristic may be compared with the non-linear (sinusoidal) response of FIG. 3.

The optical phase detector shown in FIG. 5 also provides an advantage over that shown in FIG. 1 as it has an extended operating range. In the optical phase detector shown in FIG. 1, the output is nonlinear (sinusoidal) and the greatest unambiguous operating range is therefore 180°. The optical phase detector of the present invention has a very linear response and the range can be extended to at least 360°, as shown in FIG. 6(b). It is particularly important, for example, to have an operating range greater than 360° in vector voltmeter or network analyser applications, as will be described hereinafter.

A circuit diagram of part of the optical phase detector 30 is shown in FIG. 7. In a non-linear optical phase detector 1 (i.e. as shown in FIG. 1), the detectors 5a, 5b are arranged such that the net output signal 20 varies sinusoidally about zero depending on the relative phase between the inputs 11, 12. Hence a bipolar signal 20 is output from the detector (as shown in FIG. 3). Typically, the detectors 5a, 5b may be reverse biased PIN devices, although any low noise detector may be used. Commercially available optical detectors GAP 60 or GAP 100 may be suitable devices. The value of resistor $R_1$ (as shown in FIG. 7) determines the gain and hence the peak to peak bipolar output voltage. Typically, the voltage (+V, −V) applied across the detectors may be ±9 Volts.

If the photodetectors 5a, 5b are not quite identical, means for equalising the sensitivity of the photodetectors may be included in the phase detector. It has been found that the bias voltage on one or both detectors may be varied in order to provide a fine adjustment to photodetector sensitivity.

The linearised optical phase detector 30 provides a DC output voltage which is a measure of the phase difference between the two inputs. This cannot be achieved with conventional electrical phase detectors due to the high optical frequencies of the inputs. Furthermore, the optical phase detector of the invention is advantageous as the output occurs as a direct electrical signal giving a measure of phase difference. The detector may therefore be used in a high accuracy displacement measurement apparatus for measuring displacements of the order of a few nanometres. This may be of particular use in laser metrology. For example, the output from the optical phase detector provides a measure of the phase difference between two input signals derived from the same, stable laser, where one of input signals is reflected from a displaced surface or object. The phase difference may be used to provide an indication of the displacement of the surface or object. The input laser may be stabilised by the laser stabilisation apparatus of the invention which will be described later.

The optical phase detector may also be used to phase lock two independent lasers, for example a high powered tuneable laser and a low power stable laser. This is achieved by inputting laser outputs from two different lasers to the optical phase detector (i.e. as inputs 3 and 4 shown in FIGS. 1 and 4) and employing a feedback loop connected to the tuning point of the tuneable laser.

The characteristics of the optical phase detector of the present invention may also be exploited in a frequency discriminator. In general terms, a frequency discriminator employs an input signal of ideally constant amplitude and produces an output voltage proportional to, or dependent on, the amount by which the input frequency differs from a fixed frequency.

Referring to FIG. 8, there is shown a laser stabilisation apparatus in accordance with another aspect of the invention, as will be described hereinafter. The ports of the apparatus enclosed within the dotted line, referred to generally as 60, form a frequency discriminator comprising an optical phase detector 1 (as shown in FIG. 1) and a 50/50 fibre optic directional coupler 41 for receiving an output 42 from a laser 43. The discriminator 60 also comprises means for introducing a relative delay between the two output signals 52, 53 from the coupler 41. Preferably, this may be achieved by means of two lengths of optical fibre 50, 51, each for receiving one of the output signals 52, 53 from the coupler 41, one optical fibre being longer than the other so as to introduce a relative delay. In practice it is convenient if one of the lengths of optical fibre is very short. Preferably, the one or more length of optical fibre 50, 51 may be temperature-stable optical fibre which gives the apparatus improved temperature stability. Alternatively, or in addition, to achieve temperature stability, the apparatus may be housed in a temperature-stable oven. A polarisation modulator, such as an in-fibre polarisation modulator, may be included in either one or both pathways 50, 51, as discussed previously.

It will be appreciated that, although the electro-optic modulator 35 within the optical phase detector is not shown in the frequency discriminator 60 forming part of the laser stabilisation apparatus in FIG. 8, the electro-optic modulator 35 may be included, and may be particularly important in other applications of the discriminator.

The function of the frequency discriminator 60 is to split the output of a laser 43 into two substantially equal output beams 52, 53 by means of the first coupler 41, delay one signal relative to another and then measure the optical phase difference between the two signals 52, 53. This may be done by means of the optical phase detector of the present invention. It cannot be done using conventional electrical phase detectors as the optical frequencies in question are far too high.

One output 53 from the first coupler 41 is connected through an optical fibre 51 to a second 50/50 fibre optic coupler 2, which forms part of the optical phase detector 1. The other output 52 is passed through the longer optical fibre (i.e. a delay line 50) before connection to this coupler 2. Alternatively, another type of delay medium may be used, for example integrated optic delay lines. As discussed previously, the outputs from the second coupler 2 (incorporated within the optical phase detector 1) vary in level depending on the relative phase of the input signals to the coupler 2. The optical phase detector 1 therefore provide a DC output voltage which depends on the relative phase between of the two inputs. For example, if the delay line has a delay of $T_d$ seconds, the phase shift will vary by $2\pi$ radians for every $1/T_d$ change in the input laser signal frequency. The frequency discriminator 60 therefore operates with a control characteristic which repeats every $1/T_d$ change in frequency. As shown in FIG. 3 the discriminator output voltage 20 (i.e. the output voltage from the differential amplifier 6) varies sinusoidally with the relative optical phase of the two input signals.

If the optical phase detector is arranged to operate around 0V, a bipolar output signal is produced, as described previously. If the input frequency to the first coupler varies in time, this will result in a change in the bipolar output signal. For an increased laser output frequency, the bipolar output signal from the discriminator will be of one polarity and for a decreased laser output frequency the signal from the discriminator will be of the opposite polarity. The magnitude of the bipolar output depends on the degree of phase shift and hence the frequency shift of the input laser. Typically, the peak to peak voltage may be in the range between +/−0.1–10 V.

A frequency discriminator has useful applications itself, for example to measure the output spectrum of a laser. The electrical output from the frequency discriminator 60 may be used to provide a measure of the optical frequency (or wavelength) of an input laser as long as the relative delay between fibres 50 and 51 is known and is substantially stable. This does provide a frequency (or wavelength) measurement, although it is an ambiguous one as the phase is only measured modulo $2\pi$. A further ambiguity arises from the sinusoidal response shown in FIG. 3, as the maximum unambiguous phase range is $\pi$. This is, however, a useful measurement over a small frequency range. The delay line length may be adjusted to set the required sensitivity. Ideally, the phase excursion will be kept to within a few degrees around zero to maintain linearity. Alternatively, and preferably, the linearised optical phase detector 30 (as shown in FIG. 5) may be employed within the discriminator 60 to maintain linearity and range.

The bipolar output signal of the frequency discriminator may also be exploited as a means of correcting for any phase deviation in the laser output 42. Referring again to FIG. 8, this correction process may be achieved by means of a laser stabilisation apparatus (within outer dashed line and referred to generally as 70). The laser stabilisation apparatus 70 comprises the frequency discriminator 60 and a feedback circuit. The laser output 42 to be stabilised is split into two signals, preferably of equal amplitude, by the coupler 41. Preferably, the output 42 from the laser 43 is passed through an optical isolator 62 to remove the detrimental effects of any light reflected back into the laser 43. The output 20 from the discriminator 60 is then fed back to the laser 43, so as to vary its frequency, through the feedback circuit. It is important in the laser stabilisation apparatus 70 that the discriminator output 20 is a bipolar output so that a frequency shift in either direction can be corrected to stabilise the laser output 42.

The feedback circuit comprises a control loop amplifier 72 and a loop filter 74. The output 20 from the discriminator 60 is amplified by the control loop amplifier 72 and is then passed through the loop filter 74 to produce an error signal. This error signal may then be used to control the frequency of the laser 43. An error signal of the correct sign is applied to the frequency control point so as to reduce frequency fluctuations and, hence, improve the phase noise spectrum. The "stabilised" output 76 from the laser may be taken from the apparatus by using an additional coupler 78 located in the path before the discriminator 60.

In the case of a semiconductor laser, such as a laser diode, the feedback may be applied by varying the laser current, as the laser frequency varies with current, the dominant mechanism being the change in refractive index, due to changes in the effective refractive index with current injection. Alternatively, it is be possible to build into a laser cavity a reverse-biased section such that it does not absorb light but changes refractive index with an applied voltage which derives from the discriminator output.

The function of the laser stabilisation apparatus is to reduce the output of the differential amplifier to substantially zero, thus maintaining the laser frequency at one of the stable operating points of the frequency discriminator. The laser will eventually lock to the nearest stable operating point and, once lock is achieved, the system maintains control of the laser frequency at that particular frequency. The system may therefore be used to improve the spectral stability of the laser.

Measurements have been obtained for a Lightwave Electronics Series 123 Fibre-coupled Diode pumped solid state non-planar ring laser controlled by a Series 2000 LNC Laser and Locking Accessory (LOLA). The laser had a frequency control input with a tuning range in excess of 30 MHz and a bandwidth of 100 kHz for small modulation indices and had a quoted linewidth of 5 kHz. FIG. 9(a) shows the low frequency spectrum measured at the output from the discriminator and shows the phase noise (dBc/Hz) as a function of offset frequency in free running conditions (o) (i.e. measuring the laser output directly) compared to the phase noise measurements obtained when using the laser stabilisation apparatus 70. The measurements show a considerable improvement in the close-in phase noise performance for a laser which already has a quoted linewidth of around 5 kHz (i.e. spectrally pure). In these measurements the differential delay was 1 $\mu$s. Additionally, FIG. 9(b) is a similar spectrum obtained for an E-Tek DFB laser, comparing the phase noise (dBc/Hz) as a function of offset frequency in free running conditions (i.e. open loop, measuring the laser output directly) compared to the phase noise measurements obtained when using the laser stabilisation apparatus 70. In these measurements, the differential delay was 5 ns.

As lasers with high spectral purity tend to be relatively expensive, the system enables less expensive and spectrally less pure lasers to be improved relatively cheaply and easily. The improvement of low cost semiconductor lasers may therefore also be achieved using this system.

The most common, cheap and widely used laser is a laser diode but it has a particularly poor spectral stability, especially in the case of Fabry-Perot etalon designs. The laser stabilisation apparatus may be therefore be particularly useful for improving the spectral stability of these devices, as well as DFB lasers. It may also be used to improve stable lasers which is also very useful, for example in high resolution spectroscopy and in frequency standards. In particular, the degree of phase noise improvement which may be obtained is dictated by the choice of the delay time. Typically, the delay line may introduce a relative delay of up to 10 $\mu$s between the output signals from the first coupler, depending on the range and sensitivity needed to give the required degree of spectral improvement. The delay time must also be chosen so that the open loop gain of the discriminator is reduced to well below unity at frequencies approaching the reciprocal of the delay time. For example, for a delay line of 1 $\mu$s, the open loop gain of the discriminator should be well below unity for input frequencies of around 1 MHz. If lasers, such as laser diodes, have a high noise level at greater offset frequencies a wideband loop (and short delay) must be used. Thus, for lower performance lasers, much higher loop bandwidths are required. A lower discriminator gain may be compensated for by increasing the gain of the control loop amplifier. Johnson noise from the amplifiers is likely to be the limiting factor in this gain increase.

Usually, laser diodes have two outputs, one from each facet, or mirror, the second output usually being used to monitor power level. However, it may be possible to use the second output as the input to one of the two optical detectors, hence alleviating the need for the first coupler. However, this embodiment may only be used if the two outputs from the laser are strongly correlated.

In an alternative embodiment of the invention, the laser stabilisation apparatus may comprise two or more loops in parallel. For example, a second output may be taken from the laser 43, or a split signal from output 42, and fed through a second loop having a different gain bandwidth from the first feedback loop. Each loop may then be used to feed back and control the input laser. For example, different feedback signals from each loop may be used to control separate temperature and frequency controls points on the laser, or may be combined and fed back to the same control point on the laser. Alternatively, the output from the discriminator 60 may be split, with one split signal feeding back to the laser 43 through one control loop amplifier and loop filter arrangement, and the other signal feeding back to a different control port on the laser via a second control loop amplifier and loop filter.

The laser stabilisation apparatus of the present invention is advantageous as it is an in-fibre system and is therefore is less susceptible to external factors, such as vibration, temperature changes and dust, than a free space system. This is especially true if temperature-stable optical fibre is used, as discussed previously. The apparatus may also have a higher effective Q-value compared to that which may be obtained with the known device, the Q-value depending on the length of fibre and therefore, indirectly, on the original laser stability. Furthermore, the length of the fibre optic delay line, and hence the relative delay may be selected in order to vary the sensitivity and range depending on the degree of spectral improvement required. The apparatus may be particularly useful for stabilising the output from laser diodes and other forms of laser, for example to allow them to be used more effectively in fibre optic communications systems.

Referring to FIG. 10, it is sometimes desirable to frequency modulate a laser e.g. to transmit information, or slowly sweep the frequency of the stabilised laser. This may be done by introducing an electrooptic phase modulator 80 or a differential amplifier arrangement 82, 83, as will be described hereinafter. For example, an electro-optic phase modulator 80 may be included in the laser stabilisation apparatus 70, for example in either of the delay lines 50, 51 (delay line 50 in FIG. 10). Alternatively, the electro-optic phase modulator 80 may form part of the optical phase detector itself, as described hereinbefore. In use, the laser frequency may be modulated by first stabilising the laser 43 so that the output from the differential amplifier 6 of the optical phase detector 1 is maintained at, say, zero volts and then by applying an appropriate voltage waveform to the electro-optic phase modulator 80. The linearity of the phaseshift in the electro-optic phase modulator ensures a high fidelity frequency-modulated output.

An application of this technique may be to sweep the input laser frequency slowly through an atomic absorption line to make precise measurements of the lineshape. This may be especially useful in the measurement of very narrow lines due to the spectral stability of the laser.

The apparatus of FIG. 10 may also be used to convert the stabilised laser output 76 into a stabilised optical synthesizer. In this application, the voltage waveform applied to the phase modulator 80 may have the form of a "SAWTOOTH" voltage waveform, in which the phase is swept slowly and linearly over 360° and then rapidly switched back through 360°. However, other waveforms may also be used for this application. Suitable waveforms include those which slowly increase with time and then rapidly decrease to the initial voltage level. The increasing level does not therefore have to vary linearly with time, as in the case of a SAWTOOTH waveform. For the purpose of this specification, any waveform having a slowly increasing voltage level with time followed by a rapid switch back through 360° (in the opposite direction) shall be referred to as a SAWTOOTH-like waveform. Such waveforms include waveforms in which the slowly increasing voltage level is of stepped form. The SAWTOOTH-voltage waveform may or may not be swept linearly over 360°. Typically, the timescale over which the waveform is switched back through 360° will be of the order of nanoseconds.

By way of example FIG. 11(a) shows an example of a SAWTOOTH voltage waveform (as a function of time) which may be applied to the electro-optic phase modulator 80 for this purpose and FIG. 11(b) shows the corresponding change in phase of the modulator 80 with time. During the switching process the laser frequency first follows the slow change in voltage waveform (i.e. modulator pulse) but does not follow the rapid reduction in phase by 360° because the feedback loop filter (i.e. 72, 74) will not respond at this speed. In other words, the switch through 360° degrees has no net effect because the laser and feedback loop are unable to respond to a rapid change. In addition, the output of the optical phase detector 1 is unaffected by the change of phase of 360° as its response is periodic with 360° (as shown in FIG. 3). The laser output 76 therefore remains at the new frequency. This process may be repeated many times to cover the full tuning range of the laser. A change of frequency in the opposite direction can be achieved by reversing the voltage waveform slope.

Using the apparatus shown in FIG. 10, the stabilised laser output 76 can be controlled to any required frequency by applying an appropriate voltage 86 to the phase modulator 80. In some circumstances this is useful, for example it allows the response over a small frequency range to be measured with a continuous linear sweep rather than as a series of frequency intervals.

As an alternative to an electro-optic phase modulator, a differential amplifier may be included in the feedback loop to provide a similar laser-tuning function. For example, referring to FIG. 10, a differential amplifier 82 may be included in the signal pathway at X. Alternatively, the differential amplifier may form part of the control loop amplifier 72 itself or may be placed in the path prior to the control loop amplifier 72. In either of these arrangements, rather than maintaining the output 20 from the discriminator 60 at 0V, the input 83 to the differential amplifier 82 may be set to a constant value say, 1 V. The differential amplifier 82 in the feedback loop measures the differential between 1 V and the output voltage from the discriminator 60 after passing through the control loop amplifier 72 and loop filter 74. The differential output 84 is then fed back to control the input laser 43 whose frequency changes to make the output of the loop filter approach IV. This would also allow a frequency modulation capability. By this means the laser may be swept in frequency enabling, for example, measurement of narrow spectral line widths and shapes.

It will be appreciated that, if the differential amplifier forms part of the control loop amplifier 72 itself or is placed in the path prior to the control loop amplifier 72, the operating characteristics will be different from an arrangement in which the differential amplifier is located at X, as the amplifier is located on a different side of the filter in each case. The use of the differential amplifier 82 instead of the electro-optic phase modulator 80 is a cheaper approach and may be improved by using a linearised optical phase detector (as shown in FIG. 5) in place of an optical phase detector having a nonlinear response (as shown in FIGS. 1, 8 and 10). The use of the electro-optic phase modulator 80 is the preferred approach, however, and has been built and tested in the laboratory.

FIG. 12 shows the results obtained using the optical synthesizer shown in FIG. 10, including the electro-optic modulator 80. The figure comprises eight spectra measured on an electrical spectrum analyser by mixing the optical synthesizer output at 76 with the output of a stable fixed laser frequency. In this demonstration the discriminator differential delay is 1 microsecond, so successive laser frequencies are 1 MHz apart. However, to provide an intelligible plot the spectra were taken every ten "cycles" of the phase-modulator (i.e. every ten SAWTOOTH waveform cycles and 10 MHz intervals). The scales on the plot shown in FIG. 11 are single sideband phase noise dBc/Hz at 10 dB/division (vertically) and 10 MHz/division (horizontally).

Although FIG. 12 shows every $10^{th}$ member of a "comb" of frequencies spaced by 1 MHz, it will be appreciated that the synthesizer may be tuned to a frequency between adjacent comb frequencies by applying the appropriate voltage to the modulator 80. For example, 16 steps may be provided by using a computer processor and a 4-bit digital to analogue converter (DAC), whereby the DAC converts digital controls from the computer processor into an analogue voltage to be applied to the electro-optic phase modulator 80. This would introduce phase steps of 22.5°, the $16^{th}$ step being 360° corresponding to a 1 MHz step in FIG. 12.

The optical frequency synthesizer may also be employed in combination with a diffractive element, such as a zone plate lens or a diffraction grating, to provide a programmable function. For example, the output from the optical frequency synthesizer may be used to illuminate a phase reversal zone plate lens, the focus of which is dependent on wavelength. By varying the voltage applied to the electro-optic phase modulator 80 forming part of the optical frequency synthesizer, the wavelength of the output from the synthesizer can be varied and, thus, the focus of the lens can be varied. This may be used, for example, to access different layers of an optical memory, such as a compact disc.

Alternatively, the optical frequency synthesizer may be used to illuminate a diffraction grating to "steer" the laser output. This may be used, for example, as a means of accessing a hologram.

FIG. 13 shows how the linearised optical phase detector 30 of the present invention (as shown in FIG. 4) may be used in sensor applications where the measurand modifies the properties of optical fibre 50 (or 51). For example, the sensor may be used to measure any one of temperature, pressure, strain, displacement, vibration, magnetic fields or magnetic field gradients, electric current, electric field, voltage, chemical species, biochemical parameters, medical parameters or communications characteristics. For example, referring to FIG. 13, if the output 20 from the differential amplifier 6 is set to zero volts by varying the voltage 36 applied to the electro-optic phase modulator 35, any variation in temperature, (or other measurand) of the optical fibre delay line 50 will give rise to a change of phase, hence the output from the phase detector will vary. The amount by which the voltage 36 on the electro-optic modulator 35 varies to maintain the output 20 from the differential amplifier 6 at zero (or very close to zero) provides an indication of the variation in temperature (or other measurand). The output of such a measurement will typically be very linear.

Although it may be advantageous to use temperature stable optic fibre throughout the sensor, for a temperature sensor application the use of temperature stable optical fibre for the delay line 50 is not appropriate. In such schemes a stable input laser 43 should be used. A stabilised laser input may be achieved by using the laser stabilisation apparatus of the present invention, as described previously.

In the sensor application, as distinct from the frequency discriminator application, the two optical fibres 50, 51 may have substantially the same delay, rather than having a relative delay therebetween. In some circumstances this may be of benefit. For example, if measuring the pressure on fibre 50, any temperature variation will be common to both fibres 50 and 51 and will therefore cancel if the delays are equal. Similarly, the system can employ a less stable laser. It is also possible to implement the sensor as a free-space arrangement, rather than an in-fibre apparatus, as will be described later.

The optical frequency synthesizer of the present invention may also be employed in an improved form of distributed fibre optic sensor. Conventional fibre optic sensors employ an array of Bragg gratings distributed along the length of the optical fibre. The individual gratings can then be interrogated by means of a tuneable laser, tuned close to the Bragg frequencies. By employing the optical frequency synthesizer of the present invention in a distributed fibre optic sensor arrangement, advantages are obtained due to the improved stability of the laser and, in addition, because the laser frequency can be set with high accuracy. As a consequence, it would be possible to implement such a sensor with an increased number of Bragg gratings, permitting a greater number of interrogation points to be used. An additional advantage of this fine-tuning capability is that it enables the overall distortion of a grating to be sensed at narrow frequency intervals. For example, the reflection bandwidth of a periodic grating will increase if different paths are affected differently by the measurand.

Referring to FIG. 14, the linearised optical phase detector (as shown in FIG. 5) may also be employed in an optical vector voltmeter 90 which operates at optical frequencies. The optical vector voltmeter comprises a linearised optical phase detector 30 (enclosed within the dashed line) which has an operating range of at least 360°. The function of the vector voltmeter is to take two inputs 92, 94 and to generate two outputs, one of which (output 100) is the absolute amplitude of the unknown input and the other of which (output 102) is the phase of the unknown input signal 92 relative to that of the reference input 94. The unknown input signal 92 is split and one part is input to a detector 96 to provide the amplitude output 100. Typically, the detector current varies linearly with optical intensity, from which the amplitude is readily derived. The second part 93 of the split input signal is input to the linearised optical phase detector 30, along with a reference input signal 94. The output from the differential amplifier 6 is fed back to the electro-optic phase modulator 35 via a feedback amplifier and filter 44, 46. The voltage applied to the electro-optic phase modulator 35 is adjusted, via the feedback loop, to maintain the differential amplifier 6 at a constant value, very close to zero. The electro-optic phase modulator input voltage provides the phase output 102. This gives a direct linear measure of the relative phase between the unknown input 92 and reference input 94.

FIG. 15 shows a schematic diagram to illustrate how the optical vector voltmeter 90 shown in FIG. 14 and the apparatus shown in FIG. 10 may be employed in an optical network analyser for transmission measurement of a system under test (e.g. an optical fibre of unknown properties). The optical network analyser is similar to the optical vector voltmeter, except that it provides a synthesised frequency input to the system under test 110 and typically may measure the transmitted amplitude and phase of the system 110 at a series of frequencies as the optical frequency synthesizer 108 is stepped and/or swept in frequency. As in the optical vector voltmeter, the linearised optical phase detector is arranged to have an operating range of at least 360°. The optical network analyser of the present invention is not limited to including an optical frequency synthesizer as herein described, and may include any optical frequency synthesizer apparatus.

Referring to FIG. 15, the optical network analyser comprises an optical synthesizer 108 whose output is split. The operation of the optical synthesizer is described above with reference to FIG. 10. The stabilised laser output 76 shown in FIG. 10 provides the optical synthesizer output to be split. One part of the split signal 76a is transmitted to the system under test 110 and is transmitted 92 to an optical vector voltmeter 90 (input SYS) as described above (i.e. input signal 92 in FIG. 14 is transmitted to the optical vector voltmeter 90). The other part of the split signal 76b is input to the reference port (input REF) of the optical vector voltmeter 90 (i.e. reference signal 94 in FIG. 14). The outputs 100, 102 from the optical vector voltmeter 90 form the network analyser outputs. Typically, measurements may be made over a range of optical frequencies (by sweeping and/or stepping the optical synthesizer, as described previously). Other properties, such as group delay, can be calculated digitally using the phase and frequency measurements. Results may be displayed on a VDU, or in digital form.

A variety of other measurements are also possible. For example the amplitude and phase of signals reflected by a system under test 110 may be measured using the optical network analyser shown in FIG. 16 which is essentially a rearrangement of the optical network analyser shown in FIG. 15. In this embodiment, the input signal 76 is transmitted (via a directional coupler 112) to the system under test 110 and provides a reference signal (REF) to the optical vector voltmeter 90. However, in this embodiment, the signal 114 reflected back from the system 110 provides the other input to the optical vector voltmeter 90 via the coupler 112. In practice, the system will also be terminated by a load, T.

It may be preferable to use temperature stable fibres throughout the apparatus of the present invention (e.g. the laser stabilisation system, the optical synthesizer, the frequency discriminator, the optical vector voltmeter, the optical network analyser, the optical phase detector or in sensor applications), both for connecting optical fibres used throughout the apparatus as well as the one or more delay lines 50, 51. Temperature stable fibre is commercially available. The use of temperature stable fibres enables the frequency of the laser output to be stabilised to a higher degree as changes in ambient temperature will have a reduced effect on the optical delay paths. Alternatively, the fibres may be placed in a temperature controlled environment, or the optical path length may include an auxiliary temperature dependent path in series with the fibre in order to maintain a constant delay period. Alternatively, or in addition for extra stability, the apparatus may be operated in a temperature stable oven. Polarisation maintaining optical fibre, temperature stable single mode optical fibre or temperature stable polarisation maintaining optical fibre may also be used.

Although most optical measurements of the kind herein described are invariably performed using fibre optics, the medium used in fibre optic communications, there are some circumstances in which applications of the kind described may be performed using free space optics. The apparatus shown in the various aspects of the present invention can be implemented in this way. For example, in gas sensor applications the presence of a gas species in air can be detected through dispersion associated with an absorption line since the dispersion causes an actual phase shift. Referring to FIG. 17(a), the apparatus shown in FIG. 13 is alternatively implemented by employing laser beams in free space (as opposed to in-fibre) by collimating and refocusing the radiation with lenses.

The sensor shown in FIG. 17 comprises an input coupler 178, or beam splitter, for receiving a beam of laser radiation 76 and providing two output beams of radiation, lenses 180, 182 to perform beam collimation and lenses 190, 192 to refocus the beams of radiation into the input paths 3, 4 of the phase detector shown in FIG. 5. As discussed previously, in this application the two free space paths 194 and 196 (corresponding to paths 50 and 51 in FIG. 13) may be of substantially equal length, one containing pure air (path 196) and one being contaminated by gas (path 194). Typically, the paths 194, 196 may be hollow tubes.

In an alternative embodiment, with reference to FIG. 10, the optical phase detector forming part of the discriminator in the laser stabilisation apparatus may include a second electro-optic phase modulator in the path of the input 4. In this case, a DC voltage may be applied to the first electro-optic phase modulator 35 to set the frequency of the laser, and an RE voltage may be applied to the second electro-optic phase modulator. This provides a convenient way of applying RF modulation to the laser frequency. Other benefits may also be obtained by including a second electro-optic phase modulator in the apparatus. The optical phase detector in FIGS. 4 and 5 may also include a second electro-optic phase modulator in the path of the input signal 4. In this way, for example, the "tuning" range may be extended, and even doubled, by arranging the electro-optic phase modulators in such a way that they both contribute to the tuning range.

It will be appreciated that, for the purpose of this specification, the phrase "optical" is not intended to be limited to visible wavelengths, and includes, for example, infra red wavelengths and ultra violet wavelengths.

What is claimed is:

1. A laser stabilisation apparatus for stabilising the output frequency from a laser source of radiation, the laser stabilisation apparatus comprising,
    a frequency discriminator apparatus comprising input means for receiving a primary optical input from the laser and for producing two primary optical outputs,
    means for introducing a relative delay between the two primary optical outputs,
    an optical phase detector, wherein the optical phase detector comprises
        means for receiving the two primary optical outputs and producing two combined optical outputs,
        detection means for detecting the intensity of each of the two combined optical outputs and converting the intensity of each of the combined optical outputs into an electrical signal, and
        means for measuring the difference between the two electrical signals and generating an output difference signal,
    feedback means for feeding back the output difference signal from the optical phase detector of the frequency discriminator to the laser.

2. The laser stabilisation apparatus of claim 1 comprising at least one additional frequency discriminator apparatus, each frequency discriminator apparatus having corresponding feedback means for feeding back the electrical output from the associated optical phase detector to the laser.

3. The laser stabilisation apparatus of claim 2, wherein the outputs from the optical phase detectors of the different frequency discriminators feed back to different control points on the laser.

4. The laser stabilisation apparatus of any of claims 1–3, wherein the optical phase detector includes a voltage-controlled electro-optic phase modulator for modulating the phase of the of the primary optical outputs which is input to the optical phase detector, the electro-optic phase modulator having a substantially linear response.

5. The laser stabilisation apparatus of any of claims 1–3, including a differential amplifier, the output from the optical phase detector being fed back to an input of the differential amplifier, the output from the differential amplifier being fed back to the laser.

6. The laser stabilisation apparatus of any of claims 1–3, wherein the optical phase detector forming part of the laser stabilisation apparatus comprises coupling means for receiving the two optical inputs and producing the two combined optical outputs.

7. An optical frequency synthesizer comprising:
    the laser stabilisation apparatus of claim 1 for stabilising an output from a laser, and
    means for varying the frequency of the laser output.

8. The optical frequency synthesiser of claim 7, including two optical fibres for introducing a relative delay between the two primary optical outputs, the two optical fibres having different optical path lengths.

9. The optical frequency synthesiser of claim 8, comprising an electro-optic phase modulator arranged in the path of one of the lengths of optical fibres, whereby application of a SAWTOOTH-like voltage waveform to the electro-optic phase modulator gives rise to a variation of the frequency of the laser output.

10. The optical frequency synthesizer of claim 9 and further comprising a voltage source, providing a SAWTOOTH-like voltage waveform, for applying a voltage to the electro-optic phase modulator.

11. The optical frequency synthesiser of claim 7, comprising a differential amplifier, the output from the optical phase detector being fed back to an input of the differential amplifier, the output from the differential amplifier being fed back to the laser.

12. The optical frequency synthesiser of claim 7, wherein the optical phase detector includes an electro-optic modulator.

13. A method of stabilising the output frequency from a laser comprising the steps of;
    providing a frequency discriminator apparatus comprising input means,
    inputting a primary optical input from the laser to the input coupling means and producing two primary optical outputs,
    introducing a relative delay between the two primary optical outputs,
    inputting the two primary optical outputs to an optical phase detector, comprising
        coupling means for receiving the two optical inputs and producing two combined optical outputs,
        detecting the intensity of each of the two combined optical outputs;
    converting the intensity of each of the combined optical outputs into an electrical signal,
    measuring the difference between the two electrical signals and generating an output difference signal, and
    feeding back the output difference signal from the optical phase detector of the frequency discriminator to the laser.

* * * * *